(12) United States Patent
Bateman et al.

(10) Patent No.: US 8,276,916 B2
(45) Date of Patent: Oct. 2, 2012

(54) SUPPORT FOR BULLET TRAPS

(75) Inventors: Kyle Bateman, Provo, UT (US); Thomas Marshall, Lakeshore, UT (US)

(73) Assignee: Action Target Inc., Provo, UT (US)

( * ) Notice: Subject to any disclaimer, the term of this patent is extended or adjusted under 35 U.S.C. 154(b) by 1473 days.

(21) Appl. No.: 11/781,187

(22) Filed: Jul. 20, 2007

(65) Prior Publication Data

US 2012/0104699 A1   May 3, 2012

Related U.S. Application Data

(62) Division of application No. 11/447,543, filed on Jun. 5, 2006, now Pat. No. 7,503,250, which is a division of application No. 10/317,025, filed on Dec. 11, 2002, now Pat. No. 7,194,944.

(60) Provisional application No. 60/340,201, filed on Dec. 12, 2001.

(51) Int. Cl.
    *F41J 13/00* (2009.01)
(52) U.S. Cl. ...................................... 273/410
(58) Field of Classification Search ............. 273/403, 273/404, 407, 408, 410
    See application file for complete search history.

(56) References Cited

U.S. PATENT DOCUMENTS

| | | |
|---|---|---|
| 197,398 A | 11/1877 | O'Neil |
| 385,546 A | 7/1888 | Decumbus |
| 429,942 A | 6/1890 | McBride |
| 631,175 A | 8/1899 | Parnall |
| 694,581 A | 3/1902 | Reichlin |
| 774,959 A | 11/1904 | Tresidder |
| 840,610 A | 1/1907 | Easdale |
| 867,406 A | 10/1907 | Pates |
| 941,642 A | 11/1909 | Maxim |
| 960,085 A | 5/1910 | Giles |
| 980,255 A | 1/1911 | Herms et al. |
| 1,035,908 A | 8/1912 | Richardson |
| 1,155,717 A | 10/1915 | Fouts |
| 1,199,357 A | 9/1916 | Evans, Jr. |
| 1,207,456 A | 12/1916 | Whelan |
| 1,348,283 A | 8/1920 | Koehl |
| 1,543,605 A | 6/1925 | Gavard |
| 1,559,171 A | 10/1925 | Knowles |
| 1,704,731 A | 3/1929 | Bernhard |
| 1,724,601 A | 8/1929 | Kellogg |

(Continued)

FOREIGN PATENT DOCUMENTS

AU       127432       4/1946

(Continued)

OTHER PUBLICATIONS

U.S. Appl. No. 10/287,191, filed Nov. 4, 2002, Bateman et al.

(Continued)

*Primary Examiner* — Mark Graham
(74) *Attorney, Agent, or Firm* — Bateman IP

(57) ABSTRACT

A bullet trap is disclosed which is formed without intervening sidewalls to enable cross-shooting and the like with reduced risk or ricochet or damage to the bullet trap. Furthermore, the bullet trap can be configured in a variety of ways to eliminate the need for facing plates while providing a removable attachment mechanism, to enable repair on the trap, to reduce bullet adhesion to the trap and to provide improved containment of lead and improved access to the trap.

20 Claims, 13 Drawing Sheets

U.S. PATENT DOCUMENTS

| | | |
|---|---|---|
| 1,728,046 A | 9/1929 | Duerr |
| 1,738,874 A | 12/1929 | Domingo |
| 1,767,248 A | 6/1930 | Leach |
| 1,803,514 A | 5/1931 | Thomas |
| 1,957,933 A | 5/1934 | Brandl |
| 2,008,359 A | 7/1935 | Lamb |
| 2,013,133 A | 9/1935 | Caswell |
| 2,039,552 A | 5/1936 | Reynolds |
| 2,039,602 A | 5/1936 | Luebbe |
| 2,054,665 A | 9/1936 | Tracy |
| 2,085,933 A | 7/1937 | Vaughan |
| 2,104,171 A | 1/1938 | Schwerin |
| 2,105,784 A | 1/1938 | Hagberg |
| 2,170,637 A | 8/1939 | Hatch et al. |
| 2,179,471 A | 11/1939 | Lee |
| 2,201,527 A | 5/1940 | Freeman |
| 2,208,010 A | 7/1940 | Whitmore |
| 2,209,580 A | 7/1940 | Sargent |
| 2,212,982 A | 8/1940 | Drain, Jr. et al. |
| 2,231,528 A | 2/1941 | Daniels |
| 2,269,490 A | 1/1942 | Slick |
| 2,284,510 A | 5/1942 | Cates |
| 2,350,827 A | 6/1944 | Saulnier |
| 2,372,111 A | 3/1945 | Norberg |
| 2,410,922 A | 11/1946 | Balduf |
| 2,411,026 A | 11/1946 | Conner |
| 2,412,242 A | 12/1946 | Beaud |
| 2,420,304 A | 5/1947 | Diem |
| 2,518,445 A | 8/1950 | Benson |
| 2,587,042 A | 2/1952 | Haiselup |
| 2,591,984 A | 4/1952 | Walsh |
| 2,613,934 A | 10/1952 | Tabler |
| 2,628,388 A | 2/1953 | Poth |
| 2,631,454 A | 3/1953 | Shepard et al. |
| 2,670,959 A | 3/1954 | Broyles |
| 2,706,634 A | 4/1955 | Van Valkenburg |
| 2,713,262 A | 7/1955 | Webster |
| 2,772,092 A | 11/1956 | Nikoden |
| 2,819,903 A | 1/1958 | Saunders |
| 2,855,871 A | 10/1958 | Huntington |
| 2,905,469 A | 9/1959 | Taylor |
| 2,927,665 A | 3/1960 | Hauf |
| 2,932,860 A | 4/1960 | Barth |
| 3,014,725 A | 12/1961 | Lewis |
| 3,032,808 A | 5/1962 | Fleming |
| 3,087,701 A | 4/1963 | Wallace |
| 3,103,362 A | 9/1963 | Elofson |
| 3,113,773 A | 12/1963 | Ripepe |
| 3,265,226 A | 8/1966 | Malcolm |
| 3,300,032 A | 1/1967 | Lucien |
| 3,348,843 A | 10/1967 | Stanley |
| 3,392,980 A | 7/1968 | Ortega |
| 3,404,887 A | 10/1968 | Dundr |
| 3,423,891 A | 1/1969 | Burris |
| 3,447,806 A | 6/1969 | Pfaff et al. |
| 3,485,405 A | 12/1969 | Dement |
| 3,508,302 A | 4/1970 | Settanni |
| 3,515,388 A | 6/1970 | Zachmeier |
| 3,530,633 A | 9/1970 | Scott |
| 3,567,223 A | 3/1971 | Gentiluomo |
| 3,673,294 A | 6/1972 | Matthaei |
| 3,701,532 A | 10/1972 | Nikoden |
| 3,715,843 A | 2/1973 | Ballinger |
| 3,722,182 A | 3/1973 | Gilbertson |
| 3,737,165 A | 6/1973 | Pencyla |
| 3,802,098 A | 4/1974 | Sampson et al. |
| 3,914,879 A | 10/1975 | Taylor, III |
| 3,927,500 A | 12/1975 | Plumlee |
| 3,969,855 A | 7/1976 | Lendi |
| 3,982,761 A | 9/1976 | DeVogelaere |
| 3,988,131 A | 10/1976 | Kanazawa et al. |
| 3,992,007 A | 11/1976 | Seeman |
| 4,028,856 A | 6/1977 | Dalbec |
| 4,084,299 A | 4/1978 | Noda |
| 4,086,711 A | 5/1978 | Gammarino et al. |
| 4,114,521 A | 9/1978 | Busch |
| 4,126,311 A | 11/1978 | Wagoner |
| 4,164,901 A | 8/1979 | Everett |
| 4,177,835 A | 12/1979 | Paley |
| 4,205,847 A | 6/1980 | Steiger et al. |
| 4,228,569 A | 10/1980 | Snyder |
| 4,232,867 A | 11/1980 | Tate, Sr. |
| 4,254,600 A | 3/1981 | Zwissler |
| 4,272,078 A | 6/1981 | Vinette |
| 4,288,080 A | 9/1981 | Laporte et al. |
| 4,293,320 A | 10/1981 | Robinson |
| 4,294,452 A | 10/1981 | Schlotter et al. |
| 4,317,572 A | 3/1982 | Iseli |
| 4,340,370 A | 7/1982 | Marshall et al. |
| 4,361,330 A | 11/1982 | Scharer |
| 4,395,045 A | 7/1983 | Baer |
| 4,440,399 A | 4/1984 | Smith |
| 4,445,693 A | 5/1984 | Angwin |
| 4,458,901 A | 7/1984 | Wojcinski |
| 4,479,048 A | 10/1984 | Kinoshita |
| 4,506,416 A | 3/1985 | Ohminato et al. |
| 4,509,301 A | 4/1985 | Head |
| 4,512,585 A | 4/1985 | Baravaglio |
| 4,540,182 A | 9/1985 | Clement |
| 4,546,984 A | 10/1985 | Towle et al. |
| 4,589,792 A | 5/1986 | Niziol |
| 4,598,631 A | 7/1986 | Everett |
| 4,614,345 A | 9/1986 | Doughty |
| 4,638,546 A | 1/1987 | Benshoof |
| 4,657,261 A | 4/1987 | Saunders |
| 4,677,798 A | 7/1987 | Phillips |
| 4,683,688 A | 8/1987 | Wojcinski |
| 4,691,925 A | 9/1987 | Scholem |
| 4,706,963 A | 11/1987 | Geuss |
| 4,717,308 A | 1/1988 | Kuhns |
| 4,723,749 A | 2/1988 | Carraro et al. |
| 4,726,593 A | 2/1988 | Wade |
| 4,728,109 A | 3/1988 | Simonetti |
| 4,739,996 A | 4/1988 | Vedder |
| 4,743,032 A | 5/1988 | Summers et al. |
| 4,744,910 A | 5/1988 | Bossard |
| 4,786,059 A | 11/1988 | Barini |
| 4,787,289 A | 11/1988 | Duer |
| 4,819,946 A | 4/1989 | Kahler |
| 4,821,620 A | 4/1989 | Cartee et al. |
| 4,844,476 A | 7/1989 | Becker |
| 4,846,043 A | 7/1989 | Langsam |
| 4,856,791 A | 8/1989 | McQuade |
| 4,898,391 A | 2/1990 | Kelly et al. |
| 4,911,453 A | 3/1990 | Essex et al. |
| 4,913,389 A | 4/1990 | McCracken |
| 4,919,437 A | 4/1990 | Salabé et al. |
| 5,006,995 A | 4/1991 | Toschi et al. |
| 5,040,802 A | 8/1991 | Wojcinski et al. |
| 5,050,363 A | 9/1991 | Fornell |
| 5,054,723 A | 10/1991 | Arnold |
| 5,064,457 A | 11/1991 | Weber |
| 5,070,763 A | 12/1991 | Coburn |
| 5,085,765 A | 2/1992 | Salabe et al. |
| 5,088,741 A | 2/1992 | Simonetti |
| 5,113,700 A | 5/1992 | Coburn |
| 5,121,671 A | 6/1992 | Coburn |
| 5,127,340 A | 7/1992 | Maro et al. |
| D329,680 S | 9/1992 | Burn |
| 5,145,133 A | 9/1992 | France |
| 5,163,689 A | 11/1992 | Bateman et al. |
| 5,171,020 A | 12/1992 | Wojcinski |
| 5,213,336 A | 5/1993 | Bateman |
| 5,232,227 A | 8/1993 | Bateman |
| 5,240,258 A | 8/1993 | Bateman |
| 5,242,172 A | 9/1993 | Bateman |
| 5,242,245 A | 9/1993 | Schellstede |
| 5,255,924 A | 10/1993 | Copius |
| 5,259,291 A | 11/1993 | Wilson |
| 5,263,721 A | 11/1993 | Lowrance |
| 5,277,432 A | 1/1994 | Bateman |
| 5,316,479 A | 5/1994 | Wong et al. |
| 5,322,533 A | 6/1994 | Todorovic |
| 5,324,043 A | 6/1994 | Estrella |
| 5,333,557 A | 8/1994 | Eickhoff |
| 5,340,117 A | 8/1994 | Wojcinski |
| 5,346,226 A | 9/1994 | Block |

| | | |
|---|---|---|
| 5,350,180 A | 9/1994 | Acock |
| 5,352,170 A | 10/1994 | Condo et al. |
| 5,361,455 A | 11/1994 | Kiefer |
| 5,367,860 A | 11/1994 | Cullen |
| 5,400,692 A | 3/1995 | Bateman et al. |
| 5,405,673 A | 4/1995 | Seibert |
| 5,423,150 A | 6/1995 | Hitchcock |
| 5,433,451 A | 7/1995 | De Vries |
| 5,433,763 A | 7/1995 | Shagott et al. |
| 5,435,571 A | 7/1995 | Wojcinski et al. |
| 5,441,280 A | 8/1995 | Copius |
| 5,443,352 A | 8/1995 | Schuhmacher |
| 5,456,155 A | 10/1995 | Myrtoglou |
| 5,486,008 A | 1/1996 | Coburn |
| 5,535,662 A | 7/1996 | Bateman et al. |
| 5,542,616 A | 8/1996 | Archer |
| 5,564,712 A | 10/1996 | Werner |
| 5,579,794 A | 12/1996 | Sporta |
| 5,592,789 A | 1/1997 | Liddell, Sr. et al. |
| 5,598,996 A | 2/1997 | Rath |
| 5,600,084 A | 2/1997 | Gonzalez |
| 5,607,163 A | 3/1997 | Nesler |
| 5,618,044 A | 4/1997 | Bateman |
| 5,621,950 A | 4/1997 | White |
| 5,636,995 A | 6/1997 | Sharpe, III et al. |
| 5,641,288 A | 6/1997 | Zaenglein, Jr. |
| 5,648,794 A | 7/1997 | Jelsma et al. |
| 5,649,706 A | 7/1997 | Treat, Jr. et al. |
| 5,655,775 A | 8/1997 | Pontus et al. |
| 5,663,520 A | 9/1997 | Ladika et al. |
| 5,670,734 A | 9/1997 | Middione et al. |
| 5,676,378 A | 10/1997 | West |
| 5,715,739 A | 2/1998 | White |
| 5,738,593 A | 4/1998 | Coury et al. |
| 5,748,072 A | 5/1998 | Wang |
| 5,749,671 A | 5/1998 | Chauquet |
| 5,765,832 A | 6/1998 | Huff |
| 5,779,068 A | 7/1998 | Whiten et al. |
| 5,791,090 A | 8/1998 | Gitlin et al. |
| 5,802,460 A | 9/1998 | Parvulescu et al. |
| 5,811,164 A | 9/1998 | Mitchell |
| 5,811,718 A | 9/1998 | Bateman et al. |
| 5,822,936 A | 10/1998 | Bateman |
| 5,829,753 A | 11/1998 | Wiser |
| 5,848,794 A | 12/1998 | Wojcinski et al. |
| 5,860,251 A | 1/1999 | Gleich |
| 5,901,960 A | 5/1999 | Nesler et al. |
| 5,906,552 A | 5/1999 | Padilla |
| 5,915,449 A | 6/1999 | Schwartz |
| 5,934,678 A | 8/1999 | Theissen et al. |
| 5,947,477 A | 9/1999 | Turnipseed |
| 5,950,283 A | 9/1999 | Sato |
| 5,951,016 A | 9/1999 | Bateman |
| 5,963,624 A | 10/1999 | Pope |
| 5,967,523 A | 10/1999 | Brownlee |
| 5,988,645 A | 11/1999 | Downing |
| 6,000,700 A | 12/1999 | Nesler et al. |
| 6,016,735 A | 1/2000 | Langner |
| 6,018,847 A | 2/2000 | Lu |
| 6,027,120 A | 2/2000 | Wojcinski et al. |
| 6,067,953 A | 5/2000 | Bloomer |
| 6,109,614 A | 8/2000 | Ciarcia |
| 6,162,057 A | 12/2000 | Westphal et al. |
| 6,173,956 B1 | 1/2001 | O'Neal |
| 6,223,029 B1 | 4/2001 | Stenman et al. |
| 6,230,214 B1 | 5/2001 | Liukkonen et al. |
| 6,245,822 B1 | 6/2001 | Terada et al. |
| 6,268,590 B1 | 7/2001 | Gale et al. |
| 6,283,756 B1 | 9/2001 | Danckwerth et al. |
| 6,286,269 B1 | 9/2001 | Marcum |
| 6,289,213 B1 | 9/2001 | Flint et al. |
| 6,293,552 B1 | 9/2001 | Wojcinski et al. |
| 6,308,062 B1 | 10/2001 | Chien et al. |
| 6,311,980 B1 | 11/2001 | Sovine et al. |
| 6,322,444 B1 | 11/2001 | Matsui et al. |
| 6,325,376 B1 | 12/2001 | Elliott et al. |
| 6,328,651 B1 | 12/2001 | Lebensfeld et al. |
| 6,332,243 B1 | 12/2001 | Kim |
| 6,341,708 B1 | 1/2002 | Palley et al. |
| 6,350,197 B1 | 2/2002 | Cooksey et al. |
| 6,363,867 B1 | 4/2002 | Tsilevich |
| 6,378,870 B1 | 4/2002 | Sovine |
| 6,398,215 B1 | 6/2002 | Carroll |
| 6,413,476 B1 | 7/2002 | Barnhart |
| 6,415,557 B1 | 7/2002 | McCalley |
| 6,438,906 B1 | 8/2002 | Komarowski et al. |
| 6,453,621 B1 | 9/2002 | Bundy, Jr. et al. |
| 6,463,299 B1 | 10/2002 | Macor |
| 6,478,301 B1 | 11/2002 | Witmeyer |
| 6,484,990 B1 | 11/2002 | Marshall et al. |
| 6,502,820 B2 | 1/2003 | Slifko |
| 6,533,280 B1 | 3/2003 | Sovine et al. |
| 6,543,778 B2 | 4/2003 | Baker |
| 6,575,753 B2 | 6/2003 | Rosa et al. |
| 6,588,759 B1 | 7/2003 | Bateman et al. |
| 6,679,795 B2 | 1/2004 | Ouimette et al. |
| 6,718,596 B2 | 4/2004 | Kohlstrand et al. |
| 6,728,546 B1 | 4/2004 | Peterson et al. |
| 6,730,167 B2 | 5/2004 | Shutic et al. |
| RE38,540 E | 6/2004 | Bateman |
| 6,746,325 B2 | 6/2004 | Crane |
| 6,776,418 B1 | 8/2004 | Sovine et al. |
| 6,808,177 B2 | 10/2004 | Dehart |
| 6,808,178 B1 | 10/2004 | Sovine et al. |
| 6,845,701 B2 | 1/2005 | Drackett |
| 6,865,852 B2 | 3/2005 | Gower |
| 6,896,267 B1 | 5/2005 | Le Anna |
| 6,975,859 B1 | 12/2005 | Lambert et al. |
| 6,994,347 B2 | 2/2006 | Tessel et al. |
| 6,994,348 B2 | 2/2006 | Lambert et al. |
| 6,994,349 B2 | 2/2006 | Lambert et al. |
| 7,117,645 B2 | 10/2006 | Bzorgi |
| 7,134,977 B2 | 11/2006 | Campbell et al. |
| 7,140,615 B1 | 11/2006 | Sovine et al. |
| 7,175,181 B1 | 2/2007 | Bateman et al. |
| 7,194,944 B2 | 3/2007 | Lambert et al. |
| 7,219,897 B2 | 5/2007 | Sovine et al. |
| 7,234,890 B1 | 6/2007 | Marshall et al. |
| 7,264,246 B2 | 9/2007 | Sovine et al. |
| 7,275,748 B2 | 10/2007 | Lambert et al. |
| 7,303,192 B2 | 12/2007 | Marshall et al. |
| 7,306,230 B2 * | 12/2007 | Lambert et al. ............ 273/410 |
| 7,322,771 B1 | 1/2008 | Marshall et al. |
| 7,503,250 B2 * | 3/2009 | Lambert et al. ............ 89/36.02 |
| 7,621,209 B2 * | 11/2009 | Bateman et al. ............ 89/36.02 |
| 7,653,979 B2 * | 2/2010 | Bateman et al. ............ 29/462 |
| 7,775,526 B1 * | 8/2010 | Lambert et al. ............ 273/410 |
| 7,793,937 B2 * | 9/2010 | Bateman et al. ............ 273/410 |
| 8,091,896 B2 * | 1/2012 | Lambert et al. ............ 273/410 |
| 8,128,094 B2 * | 3/2012 | Bateman et al. ............ 273/410 |
| 2004/0034984 A1 | 2/2004 | Aoki et al. |
| 2005/0022658 A1 | 2/2005 | Bateman et al. |
| 2006/0208425 A1 | 9/2006 | Lambert et al. |
| 2006/0220319 A1 | 10/2006 | Lambert et al. |
| 2006/0234069 A1 | 10/2006 | Sovine et al. |
| 2006/0240388 A1 | 10/2006 | Marshall et al. |
| 2006/0240391 A1 | 10/2006 | Sovine et al. |
| 2007/0040334 A1 | 2/2007 | Marshall et al. |
| 2007/0045965 A1 | 3/2007 | Bateman et al. |
| 2007/0069472 A1 | 3/2007 | Lambert et al. |
| 2007/0072537 A1 | 3/2007 | Bateman et al. |
| 2007/0102883 A1 | 5/2007 | Parks et al. |
| 2007/0114724 A1 | 5/2007 | Bassett et al. |
| 2007/0235943 A1 | 10/2007 | Bateman et al. |
| 2008/0022847 A1 | 1/2008 | Bateman et al. |

FOREIGN PATENT DOCUMENTS

| | | |
|---|---|---|
| AU | 202340 | 8/1954 |
| CH | 597 451 | 4/1978 |
| DE | 227342 | 1/1910 |
| DE | 227 342 | 10/1910 |
| DE | 498 308 | 5/1930 |
| DE | 514 123 | 12/1930 |
| DE | 877 489 | 5/1953 |
| DE | 2021170 | 11/1971 |
| DE | 214 433 | 10/1984 |
| DE | 3635741 A1 | 7/1992 |
| EP | 0 523 801 | 1/1993 |

| | | |
|---|---|---|
| EP | 528722 A1 | 2/1993 |
| FR | 832.754 | 10/1938 |
| FR | 849.829 | 12/1939 |
| FR | 1.156.211 | 5/1958 |
| FR | 2461069 | 7/1980 |
| GB | 6353 | 0/1909 |
| GE | 280832 | 11/1927 |
| GE | 725189 | 3/1955 |
| NL | 7700295 | 7/1978 |
| WO | WO 94/27111 | 11/1994 |

OTHER PUBLICATIONS

U.S. Appl. No. 11/494,788, filed Jul. 26, 2006, Bateman et al.
U.S. Appl. No. 11/349,739, filed Feb. 8, 2006, Bateman et al.
U.S. Appl. No. 11/349,738, filed Feb. 8, 2006, Bateman et al.
U.S. Appl. No. 11/506,763, filed Aug. 18, 2006, Sovine et al.
U.S. Appl. No. 11/506,413, filed Aug. 17, 2006, Wright et al.
U.S. Appl. No. 11/530,280, filed Sep. 8, 2006, Marshall et al.
U.S. Appl. No. 11/745,077, filed May 7, 2007, Bassett et al.
Caswell International Corp., Bullet Trap Design, Circa 2002.
Declaration of Kyle Bateman re Circa 2001 Bullet Trap Design.
Savage Arms, Shoot House Bid and Specification, Bid dated Oct. 1998.
Porta Target Shoot House circa 1997.
Super Trap Bullet Containment Systems, circa 1998.
1995 Guide to Affordable Target Technology, Duel Atron, Target Systems.
United Steel Sash, Tussed Concrete Steel Co., Youngstown, Ohio, Copyright 1903, p. 23.
Exhibit A: cross sectional view of a bullet trap designed and manufactured by Action Target.

* cited by examiner

SUPPORT FOR BULLET TRAPS

RELATED APPLICATIONS

The present application is a divisional application of U.S. patent application Ser. No. 11/447,543, filed Jun. 5, 2006 now U.S. Pat. No. 7,503,250, which is incorporated herein by reference in its entirety, which is a divisional application of U.S. patent application Ser. No. 10/317,025, filed Dec. 11, 2002, now U.S. Pat. No. 7,194,944, which is incorporated herein by reference in its entirety, and which claims the benefit of U.S. Provisional Patent Application No. 60/340,201, filed Dec. 12, 2001, which is incorporated herein by reference.

BACKGROUND OF THE INVENTION

1. Field of the Invention

The present invention relates to a bullet trap for receiving projectiles fired at the bullet trap and for containing the projectiles. More particularly, the present invention relates to a system which allows cross-firing of bullets with much less risk of ricochets and damage to the trap, and to a system which allows bullet traps to be constructed less expensively and repaired more easily.

2. State of the Art

In order to maintain their proficiency with various types of firearms, law enforcement officers and others routinely engage in target practice. For many years, target practice was conducted in environments in which there was little concern for recovering the bullets. Firing ranges commonly used a large mound of dirt to decelerate the bullet after it had passed through the target. Such a system was generally safe, in that the dirt was effective in stopping the bullet and preventing injuries. (While the most common projectile at a firing range is a bullet, other projectiles, such as shot, can also be present. Thus, as used herein, projectiles includes bullets and vice versa.)

More recently, considerable concern has been raised about the lead contained in the bullet. Though the bullet fired into the mound of dirt was safely contained from the point of being a moving projectile with a significant amount of inertial momentum, the lead in the bullet was free to escape into the environment. For example, when a mound containing a number of bullets became wet, lead could leach into surrounding soil and even the groundwater. When a range was used frequently, a considerable amount of lead could be released into the environment, thereby injuring wildlife and contaminating groundwater supplies.

Partially due to these concerns, firing ranges increasingly turned to the use of bullet containment chambers to capture fired bullets and fragments thereof. The bullets may be recycled or otherwise disposed of in accordance with environmental regulations, thereby significantly reducing the risks of lead escaping into the environment.

Bullet containment chambers typically include an opening through which the bullet enters, a deceleration mechanism for slowing the bullet to a stop, and a container mechanism for holding the bullet until it is retrieved from the containment chamber. Either end of the containment chamber includes a sidewall which limits the lateral travel of the projectile. If a projectile impacts the side wall, it may ricochet or, if a high powered round, may puncture the side wall.

One early bullet containment chamber is shown in U.S. Pat. No. 684,581 to Reichlin. The chamber had an opening over which a target was placed. The chamber sloped downwardly and inwardly to provide a rounded deceleration path. A container area was also provided at the bottom of the unit to collect bullets.

An alternate design is shown in U.S. Pat. No. 2,013,133 to Caswell. Rather than directing the bullet in a vertically circular path, the bullet stop of Caswell had the bullet travel initially in a generally horizontal circle as it decelerated. As the bullet slowed, it would drop to the bottom of the deceleration chamber where it could be retrieved.

Yet another bullet containment system is contained in U.S. Pat. No. 5,535,662 to Bateman. The containment system utilizes angled impact plates to decelerate bullets. Once the bullets had slowed sufficiently, they would fall into a canister mounted below the containment chamber.

All of the above containment systems suffer from the same common problem. Specifically, the side walls limit the ability of the bullet to travel laterally and raise the concerns discussed above with respect to ricochets and damaging the side plates when the shooter is shooting at an angle other than straight ahead.

In addition to the above, many of the prior art containment systems have problems with bullets sticking to the deceleration plates. Additionally, those which provide a containment chamber often limit the access to the chamber. If the chamber becomes damaged or needs maintenance or repair work, it is extremely difficult to access the interior of the trap.

Thus, there is a need for an improved bullet trap which allows cross-shooting with less risk of ricochets or damaged side plates. There is also a need for a trap which allows for easier repairs and for access to the interior of the trap.

SUMMARY OF THE INVENTION

It is an object of the present invention to provide an improved bullet trap.

It is another object of the present invention to provide a bullet trap which may be used with cross-shooting.

The above and other objects of the invention are realized in specific illustrated embodiments of a bullet trap, a preferred embodiment having greater than eight feet between side walls.

In accordance with one aspect of the invention, the bullet trap has a plurality of segments disposed adjacent one another, with at least two adjoining segments not having a sidewall therebetween.

In accordance with yet another aspect of the invention, a plurality of segments are attached in a row with facing strips disposed so as to hold the segments together. The plurality of segments enables the containment chamber to be considerably wider than eight feet. This, in turn, significantly increases the ability to shoot at wide angles without fear that the bullet will damage the trap or will ricochet.

In accordance with another aspect of the invention, the containment chamber is formed by a plurality of elongate plates disposed in generally horizontally extending rows. The plates of each row are disposed adjacent the plates of each neighboring row, but are not fixedly attached thereto. Thus, the plates of any particular row are able to deform slightly when impacted by a bullet without placing any additional stress on adjacent rows of plates.

In accordance with yet another aspect of the present invention, each row of plates (or elongate plate) is held in a non-rigid engagement with a support member. This can be accomplished by having the plates of a row nest in a slot in a support panel or they can rest on a common interior support. Unlike conventional bullet traps, this allows the plates to move slightly when impacted by a bullet. This, in turn, minimizes bullets sticking to the plate.

Additionally, by forming the containment chamber by a plurality of plates which are not fixedly attached to one another, a person charged with maintaining the trap can remove some or all of the plates from a particular row to gain access into the interior of the trap. This can facilitate maintenance or cleaning of the trap. It also allows a plate to be readily replaced if it is some how damaged. Rather than cutting through the plate and replacing it with a new piece, a damaged plate can be removed and replaced. Instead of the bullet trap being unusable for days or weeks, replacing a damaged plate can have the bullet trap usable again within hours. Additionally, because welding is not used on the plate steel, the integrity of the steel is maintained.

In accordance with another aspect of the present invention is that containment chamber is at least partially surrounded by a containment shell. This enables the rows of plates to move without concern that lead dust may escape from the containment chamber.

In accordance with yet another aspect of the present invention, one or more doors are disposed in the containment shell. The doors provide ready access to the containment chamber and associated parts, such as the hopper at the bottom of the bullet trap, or the rows of plates for maintenance.

It accordance with still yet another aspect of the invention, the doors are biased in a closed orientation to prevent accidental release of lead tainted air. This can be accomplished by a spring loaded door, or the use of a magnetic seal on the door.

In accordance with another aspect of the present invention, pieces of plate are held together by a backing plate and fasteners which are attached to each plate. Preferably, the fasteners are bolt shanks which are spot welded to the plates along an edge to be joined. Spot welding is preferred because it has less effect on the steel plate. Once the bolt shank is welded to the edges of the pieces to be joined, a backing strip with holes cut or drilled to receive the bolt shanks is mounted so that the backing strip covers the seam between the plates and securely holds the plates together. The use of the backing strip in this manner provides several advantages. First, it is easy to mount and remove. Second, it securely holds the plates of steel together and provides a tortuous path which prevents projectiles from passing between the plates. Third, it provides a generally smooth bullet impact surface on the front of plates to reduce the likelihood of ricochet. Fourth, the slight difference between the size of the holes in the backing plate allows for expansion and contraction of the metal plate as temperatures change without stressing the plates or causing buckling. A very small gap can even be left between the plates which is filled with caulk or some other damping mechanism.

In accordance with still another aspect of the present invention, a plurality of rounded or c-shaped plates are used to decelerate bullets. Unlike planar plates, they are less likely to be deformed after repeated impacts of projectiles.

In accordance with another aspect of the present invention, the bullet trap include a support beam. The support beam is configured to support both the channeling plates and the bullet containment chamber. Furthermore, in accordance with one aspect of the invention, the support beam can form part of the bullet containment chamber.

In accordance with still another aspect of the present invention, the support beam can be formed from individual sections to allow hangers or supports to be attached to the support beam quickly and economically.

In accordance with still another aspect of the present invention, the support beam can be of varying dimension to thereby provide adequate support while minimizing the amount of steel required to form the beam.

In accordance with yet another aspect of the present invention, the bullet containment chamber is held in place at least partially by one or more clamp mechanisms to ensure that the chamber backing plates are securely held in place.

In accordance with still another aspect of the invention, the support beam can include one or more openings for receiving the clamp mechanisms. Thus, the clamp mechanisms are held by the support beam to ensure that the support beam and the containment backing plates are securely attached to one another.

In accordance with still another aspect of the invention, a variety of different attachment mechanisms are provided for securing plates adjacent one another to prevent a bullet from passing between the seam along the plates.

In accordance with still another aspect of the invention, the bullet trap includes impact or channeling plates forming a primary impact zone, a secondary impact zone and a second primary impact zone prior to the aperture of the bullet containment chamber to thereby decrease wear on the bullet trap.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. Additionally, it should be appreciated that the components of the individual embodiments discussed may be selectively combined in accordance with the teachings of the present disclosure. Furthermore, it should be appreciated that various embodiments will accomplish different objects of the invention, and that some embodiments falling within the scope of the invention may not accomplish all of the advantages or objects which other embodiments may achieve.

Figure 1:
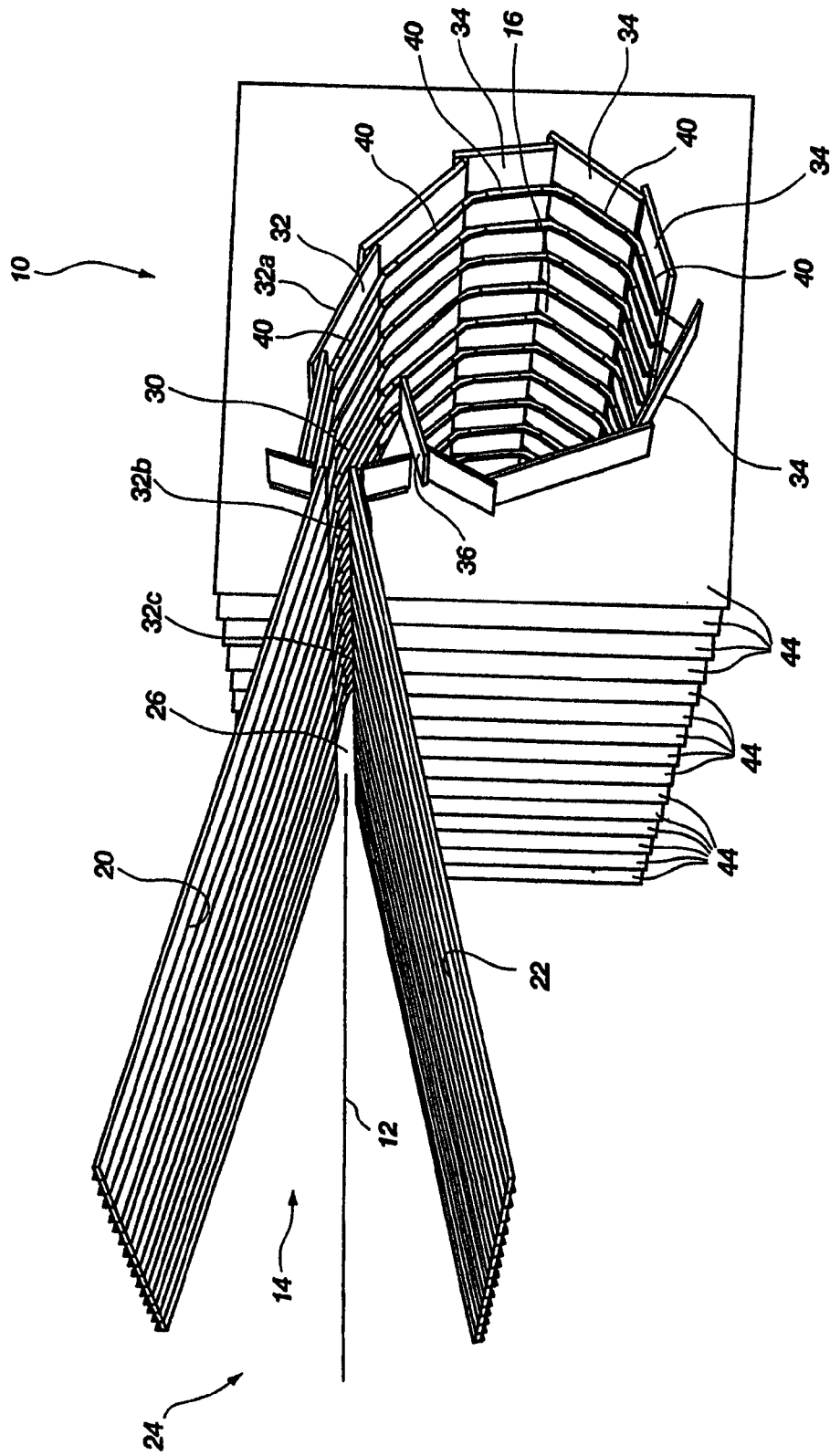
FIG. 1 shows a perspective view of a bullet trap made in accordance with the principles of the present invention.

Referring to FIG. 1, there is shown a perspective view of a bullet trap, generally indicated at 10, made in accordance with the principles of the present invention. The bullet trap 10 includes a channel 14 and a containment chamber 16.

The channel 14 has an upper plate surface 20, which is preferably formed by a plurality of channeling plates connected to one another, and a lower plate surface 22, preferably formed by a plurality of channeling plates. The upper plate surface 20 and lower plate surface 22 are arranged on complementary acute angles to the generally horizontal zone of projectile travel 12. As a bullet is fired it travels from a wide opening 24 in the channel 14, to a narrow opening 26. If a projectile is on a trajectory which is lower than the narrow opening 26 it is deflected by the lower plate surface 22 of the channel 14 back toward a conforming path. If a projectile is on a trajectory which is higher than the narrow opening 26 it is deflected by the upper plate surface 20 of the channel 14 back toward a conforming path. In any event, the projectile is guided into the narrow opening 26 by the plates which are at generally acute angles (10 degrees-30 degrees, but optimally about 15 degrees) to horizontal, so that the projectile remains in tact while traveling through the channel and into the chamber.

The narrow opening of the channel 26 is ideally substantially coextensive with an ingress 30 to the chamber 16. As the projectile travels through the ingress 30 it impacts with the primary impact plate surface 32. As with the channel 14, this is preferably formed by a plurality of plates 32a, 32b, 32c held together in a horizontal line. Thus, if plates which are 2 feet tall and 8 feet wide are used, the primary impact plate surface 32 will be about 24 feet wide.

The impact plate 32 is preferably at an equal or greater angle of incidence with the generally horizontal zone of projectile travel so that the impact with the plate 32 is of equal or greater force than the general impact the projectile may have had with either the upper 20 or lower 22 channel plate. The result of projectile impact with the primary impact plate 32 is that the bullet or fragments thereof are deflected into a sequence of impact plates surfaces 34 which are preferably of an increased angle of incidence, than the primary impact. As with the other plate surfaces, the impact plate surfaces 34 are preferably formed by a plurality of impact plates held together in generally horizontal lines.

A terminal impact plate surface 36 terminates adjacent the chamber ingress 30. Thus, the impact plate surfaces 32-36 form a series of more or less continuous impact surfaces extending from the top of the chamber ingress 30, around to the bottom of the chamber ingress. Likewise, by having the surfaces of the channel 14 and containment chamber 16 formed by horizontally juxtaposed plates, a channel 14 and containment chamber 16 can be formed with considerable width without the use of sidewalls. The absence of sidewalls allows the bullet trap 10 to be used for cross-shooting, i.e. shooting at a variety of angles, without the disadvantages sidewalls provide.

The rows of plates forming the primary impact surface 32 and other impact surfaces 34, 36 are supported by one or more interior support frame(s) 40 and support legs 44. The plates forming the impact surfaces 32-36 rest on the frame, and typically fit within slots formed in the support legs 44. In one embodiment, however the plates forming the impact surfaces 32-36 are not fixedly attached to the support frame(s) 40 or to the support legs 44. In fact, the plates forming the impact surface are not rigidly attached to one another. Not only does this save on manufacturing costs (i.e. there is no welding), it also allows the plates to move slightly each time they are impacted by a bullet. This in turn tends to knock lead debris from the plates, rather than allowing it to accumulate.

An additional advantage of this approach is that the impact surfaces can be readily replaced. For example, the primary impact surface 32 is prone to wear faster than other impact surfaces because the bullets impacting that surface are at a higher velocity. If the bullets cause wear of the primary impact surface, the operator of the range need only disassemble and remove the primary impact surface. A new primary impact surface can then be added and reassembled. With prior art configurations, replacing the primary impact surface is nearly impossible. Furthermore, the entire trap could be disassembled and reassembled if desired. This would allow a user to move the trap to different locations without cutting welds, etc.

In addition to holding the support frame 40 in place, the support legs 44 support the weight of the trap. This is important because, unlike the trap discussed in U.S. Pat. No. 5,535,662, the bullet trap 10 of the present invention is not generally built as individual containment units and then brought together. Rather, a plurality of open segments are attached to one another to form a large containment chamber having extended width without sidewalls, or elongate impact surfaces are formed and then they are placed in an array to form an elongate bullet containment chamber. This distance is greater than eight feet wide and preferably much wider, i.e. 20 to 40 feet wide. Such width allows for a much greater angle of cross-shooting while minimizing the risks of ricochet, etc. It also helps to minimize costs.

Figure 2:
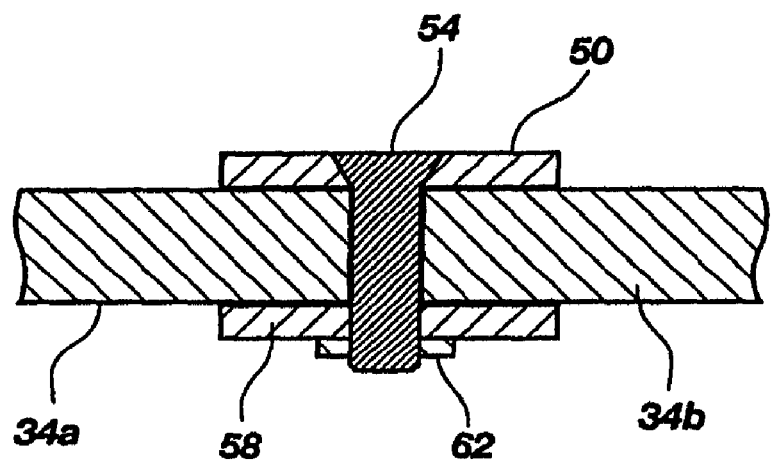
FIG. 2 shows a cross-sectional view of two adjoining plates connected by a facing strip in accordance with one aspect of the present invention.

Turning now to FIG. 2, there is shown a cross-sectional view of a pair of impact plates 34a and 34b joined together by a facing strip 50 in accordance with one aspect of the present invention. The facing strip 50 can be made from the same type of steel plate or other metal as the individual plates.

The facing plate 50 covers the space between the two plates 32a and 32b and helps hold them together. The facing plate 50 may be welded to the plates, which can also be welded to each other. Such a construction, however, is expensive, risks compromising the steel due to the welding, and makes repair very difficult.

In the alternative, the facing plates 50 can have a bolt 54 or similar mounting structure attached to or extending therethrough. A backing plate 58 or a washer can be disposed on the opposing sides of the plates 32a and 32b and a nut 62, or other fastener is used to secure the bolt. Tightening the nut 62 squeezes the facing plate and backing plate or washer against the plates 32a and 32b and secures them together.

In constructing the trap, a containment chamber can be built in a conventional manner with the impact plates being attached to one another. However, instead of placing sidewalls on the sides of the containment chamber, it is attached by the facing plates to other containment chambers to form one large containment chamber uninterrupted by sidewalls. Thus, the potential width of the bullet trap is virtually limitless and cross-shooting can occur at a wide variety of angles.

Likewise, the elongated containment chamber can be built by a plurality of elongate impact surfaces which are placed adjacent one another in a generally circular pattern to define a bullet containment chamber. In such a configuration, there are not a series of chambers, per se, but one long chamber defined by one impact surface at a time.

Figure 2A:
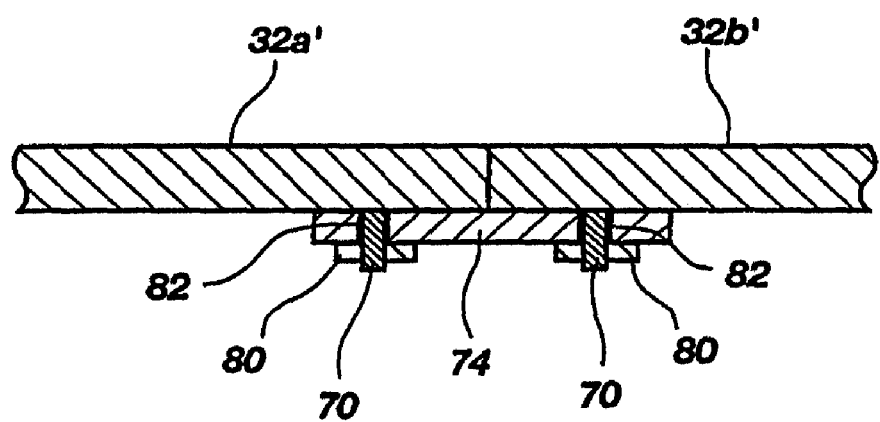
FIG. 2A shows a cross-sectional view of an alternate method for attaching two plates in accordance with the principles of the present invention.

Turning now to FIG. 2A there is shown an alternate embodiment for attaching two plates together. As shown in FIG. 2A, each of the plates 32a' and 32b' has a stud 70 attached thereto. Ordinarily, a plurality of studs, in the form of bolt shanks, are attached to the plates. This is best accomplished by use of a spot welder which will quickly attach the bolt shank to the metal plates with little risk of softening the metal.

The two plates 32a' and 32b' are held together by a backing plate 74 which has holes for receiving opposing studs 70 of the plates. A pair of nuts 80 are then used to hold the studs 70 in the holes of the backing plate 74, thereby holding the plates 32a' and 32b' together.

One marked improvement of the configuration shown in FIG. 2A is that there is no facing plate on which a bullet might ricochet. The backing plate 74, however, does provide a tortuous path. This significantly reduces the risk of bullet fragments flying through small openings between the plates, commonly called splatter through. The position of the backing plate 74 also allows the opposing side to have a clean appearance. This is particularly advantageous on the plates 20 and 22 which guide the bullet into the containment chamber. Rather than having a number of facing plates, the plates appear on the front side to only be resting next to each other, but are securely mounted together on the back side.

A second marked improvement achieved by the use of studs 70 and a backing plate 74 is the compensation for thermal expansion. The holes 82 formed in the backing plate 74 are slightly bigger than the studs 70. As the plates 32a' and 32b' expand and contract, the backing plate allows for small adjustments, i.e. up to about ⅛-1/16 of an inch. This prevents warping, etc. without compromising the joint. If a bullet hits a joint directly, a small amount of lead can enter between the two plates 32a' and 32b'. Once they impact the backing plate, however, the inertia is spent and the risk of splatter through is virtually nonexistent.

Figure 3:
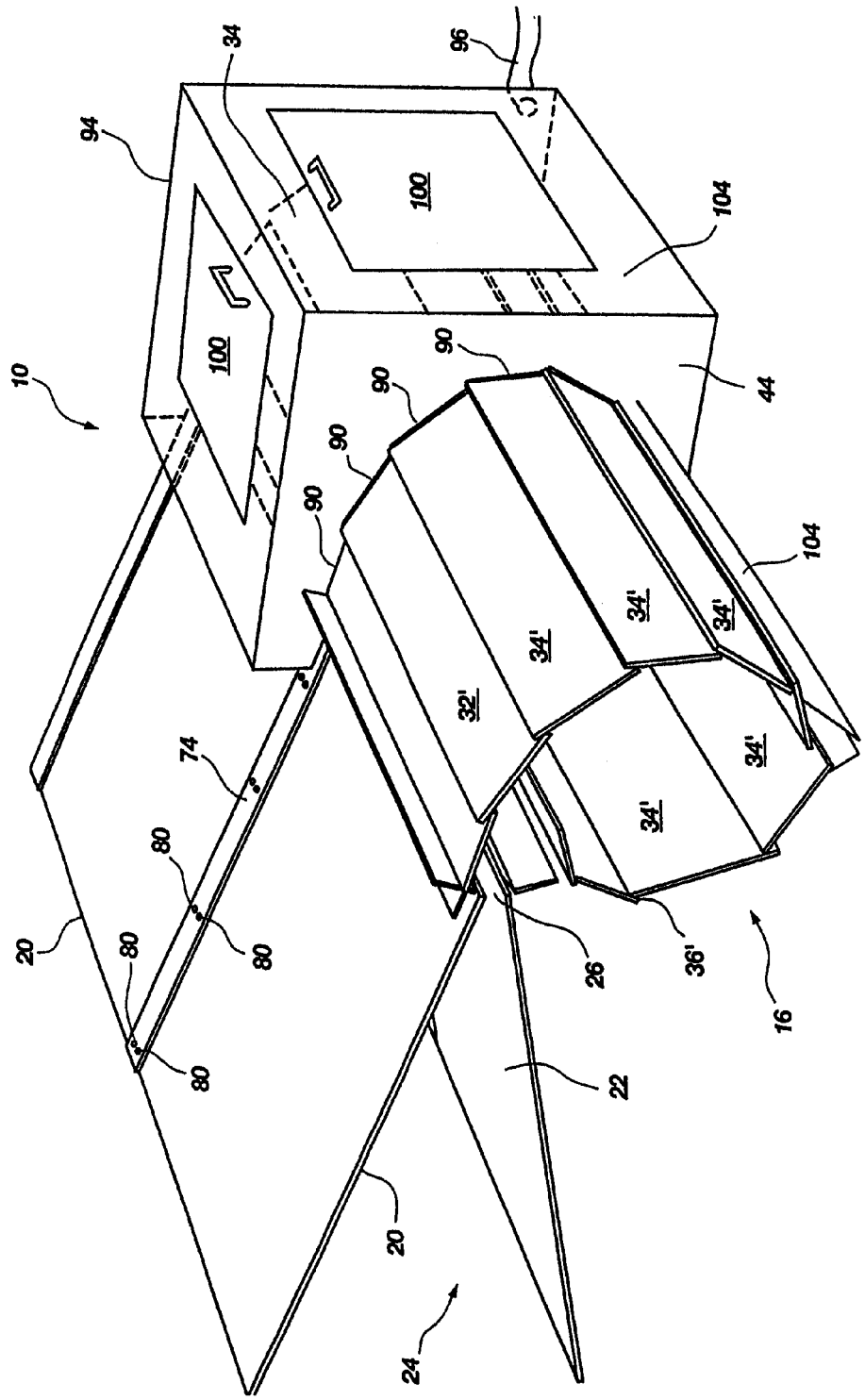
FIG. 3 shows a partial cut-away view of a bullet trap configured in accordance with the present invention having a containment shell at least partially surrounding the containment chamber.

Turning now to FIG. 3, there is shown a partially cut-away view of a bullet trap 10, formed in manner discussed above. The bullet trap 10 has channel 24 defined by plates forming an upper plate surface 20 and a lower plate surface 22. The channel extends from a wide opening 24 to a narrow opening 26 which leads into the chamber, generally indicated at 16.

The containment chamber 16 is formed by a plurality of elongate plate arrays 32', 34' and 36'. Each plate array 32', 34' and 36' can be made from a single long piece of hardened steel, or can be smaller plate segments attached together in a manner discussed above with respect to FIGS. 2 and 2A. Additionally, other attachment mechanisms can be used if desired.

The plates forming the plate arrays 32', 34' and 36' are disposed about a support frame, such as frame 40 of FIG. 1. The plate arrays 32', 34' and 36' can be attached to the support frame, or they can also remain unattached. In the unattached version, the support frame supports the plate arrays, it also allows them to be deflected slightly by the impact of the bullet. The deflection helps knock loose lead dust and fragments which remain on the plate arrays. The lack of rigid attachment also facilitates servicing of the bullet trap 10.

The plate arrays 32', 34' and 36' also can be supported by nesting in slots in a support leg 44 which supports the weight of the trap. The slots are designed to hold the plate arrays 32', 34' and 36' in desired shape while still allowing some movement of the plates.

Also shown in FIG. 3 is a containment shell 94 which is disposed about the containment chamber 16. Because the containment chamber 16 is formed by plate arrays 32' 34' and 36' which are not fixedly attached together, small amounts of lead dust can escape between the arrays. The containment shell 94, however, prevents the dust from leaking into the atmosphere surrounding the trap. If desired, a vacuum system 96 can be disposed in communication with the containment shell 94 or directly into the containment chamber 16.

Disposed in the containment shell 94 is one or more doors 100. The doors 100 provide access to the interior of the containment shell 94 without having to remove the containment shell. Thus, the operator of the bullet trap can perform maintenance or repairs on the containment chamber 16, or on the hopper 104 or conveyer mechanism (not shown) for transporting bullets without the requirement of removing bolts, etc. This also limits the area of the containment chamber which is exposed to the environment, thereby limiting concerns of lead containment.

Figure 3A:
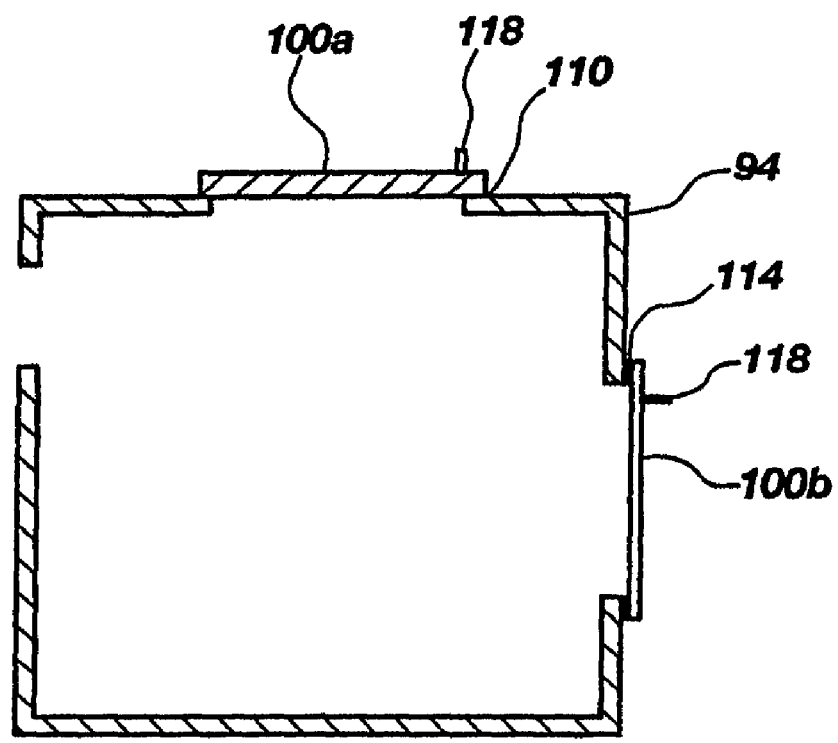
FIG. 3A is a cross-section of the containment shell.

Turning to FIG. 3A, there is shown a cross-sectional view of the containment shell 94. It will be appreciated that, while the shell can completely surround the containment chamber 16, it can also be made to wrap around only a portion of the containment chamber. Such a configuration might be used, for example, if some of the impact plate arrays 32', 34' and 36' were welded together or otherwise attached to each other (i.e. some sort of filler) to eliminate the risk of lead dust escaping from the containment chamber along those portions.

FIG. 3A also shows the doors 100a and 100b. The top door 100a is preferably provided with a spring loaded hinge 110. The hinge helps to automatically return the door 100a to its closed position when it is released.

The containment shell 94 also includes a second door 100b. The door 100b is provided with a magnetic seal 114 which holds the door closed until the seal is broken. The door 100b may then be opened to repair the containment chamber, to clean the hopper or remove containers which receive the bullets. Once the repair, etc., is completed, the door 100b need merely be pushed closed to prevent lead inside of the containment shell from escaping.

A handle 118 is provided on each door 100a and 100b to facilitate opening and closing the door. Thus, the door preferably forms a tool-less entry port into the containment shell 94.

Figure 4:
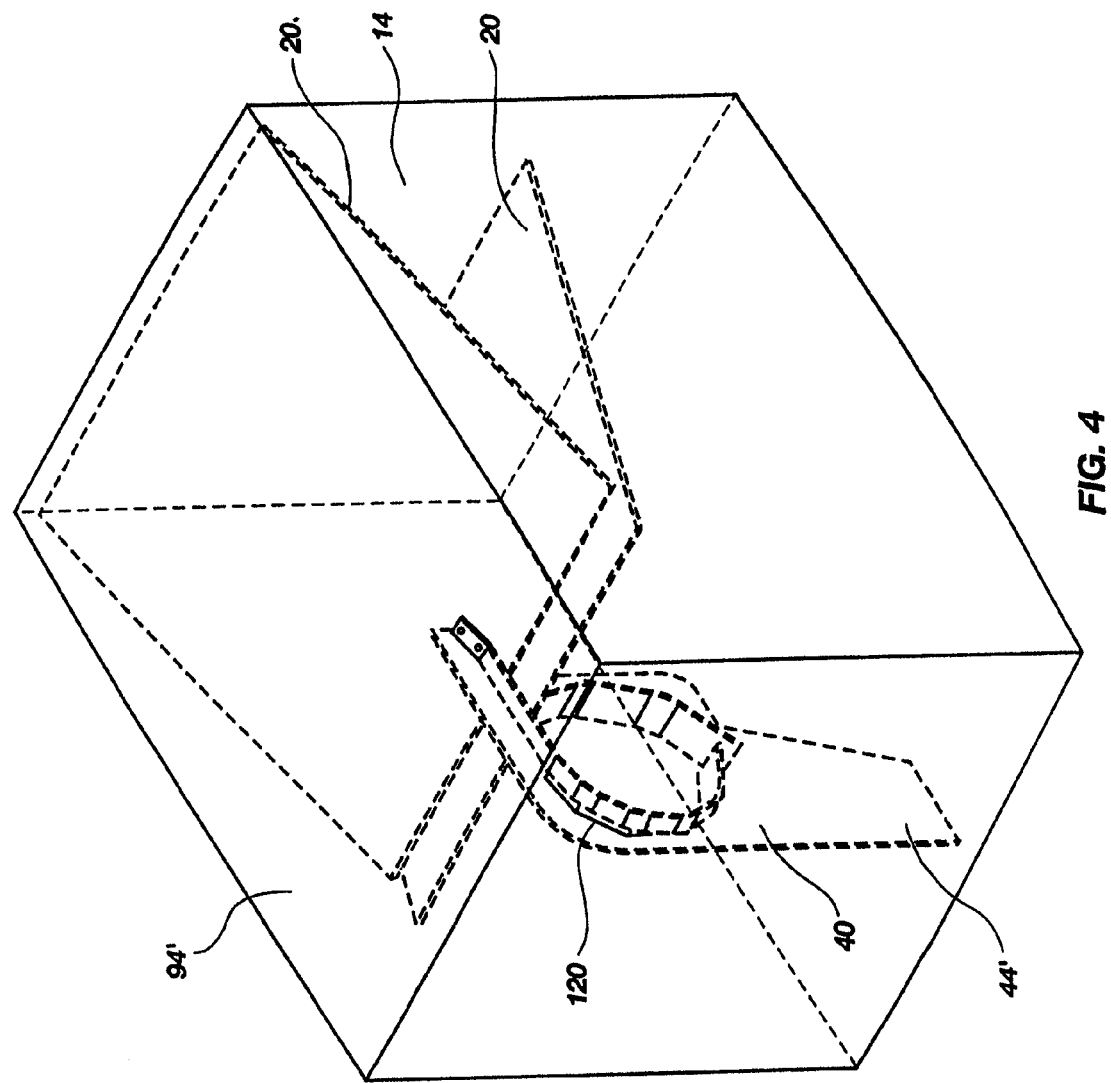
FIG. 4 shows an alternate embodiment of a containment chamber with a support leg and support frame disposed therein.

Turning now to FIG. 4, there is shown an alternate embodiment of a containment shell 94'. The containment shell 94' extends outwardly to enclose the plates forming the upper impact surface 20 and the lower impact surface 22 of the channel 14 leading into the containment chamber. The plate arrays forming the containment chamber have been omitted in FIG. 4 to show the support frame 40 and support leg 44' more clearly.

The support frame 40 preferably has two halves formed from continuous pieces which are angled to support the impact plate arrays. (If desired, a single piece frame could be used with the frame extending over the opening by which bullets fall from the trap.) The plates rest on support frame 40 to provide the generally round shape of the containment chamber. The plates may abut against the support let 44', or the support leg can have slots 120 formed therein for receiving the impact plates. It is preferred however, that the slots 120 be sufficiently large to allow some movement of the impact plates when impacted by a round.

The containment shell 94' also lacks doors for accessing the containment chamber, hopper (not shown), etc. Such a containment shell could be used when an automated bullet removal system is provided. However, such a configuration is still disadvantageous, as it will require partial disassembly to make any repairs as they become necessary.

Figure 5:
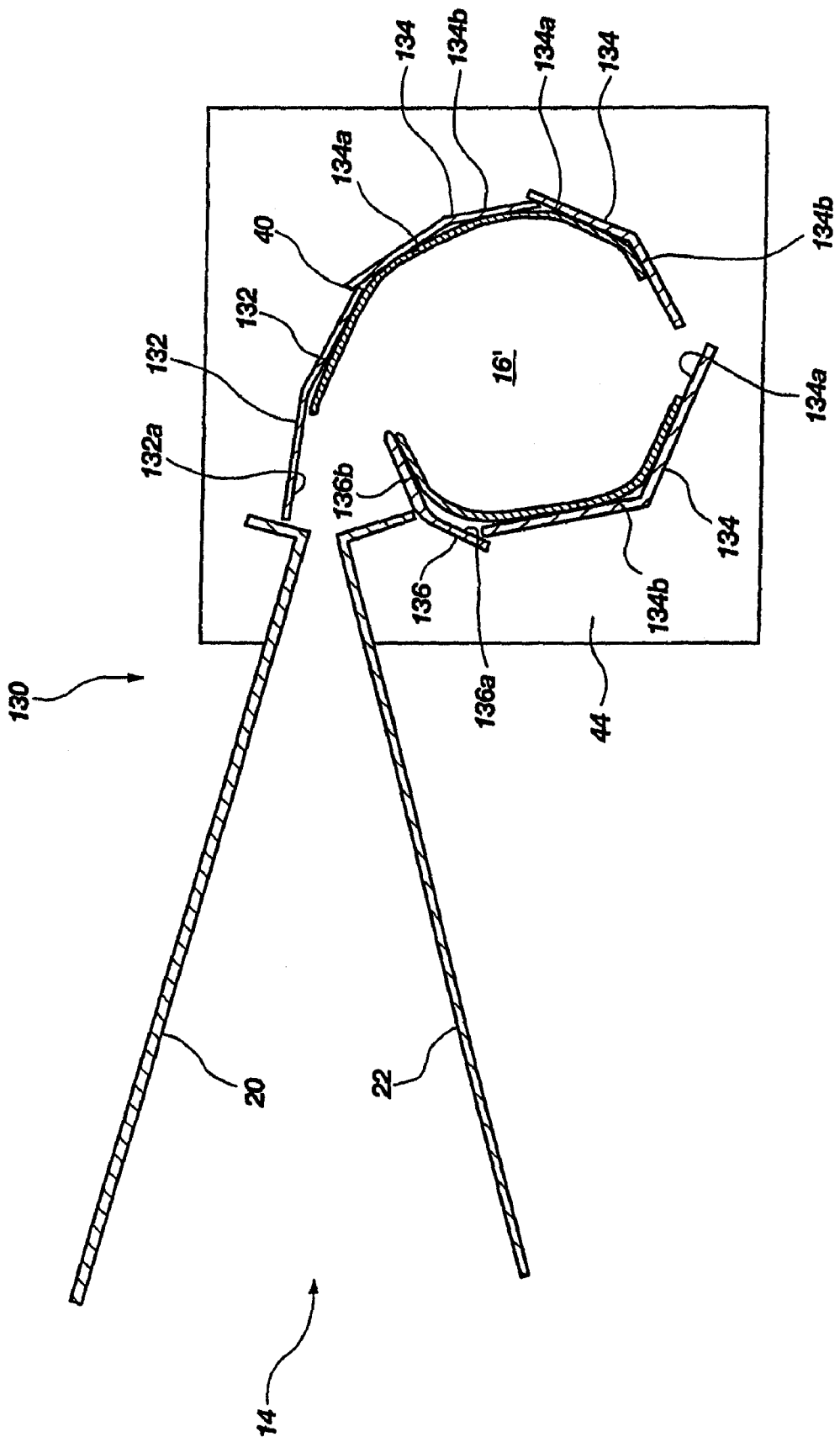
FIG. 5 shows an end view of a bullet trap made in accordance with another aspect of the present invention.

Turning now to FIG. 5, there is shown a side cross-sectional view of a bullet trap, generally indicated at 130. The bullet trap 130 includes the channel 14 with the upper and lower impact surfaces 20 and 22 for directing the bullet into the containment chamber 16'. Rather than being formed by a plurality of planar impact plates, the containment chamber 16' includes a plurality of C-shaped or curved impact plates. A primary impact plate 132 has first and second impact surfaces 132a and 132b, as does each of the secondary impact plates 134, 134a and 134b and the terminal impact plate 136, 136a and 136b.

The curved plates 132, 134 and 136 facilitate construction of the bullet trap, as fewer plates are required to assemble the trap. Additionally, because the plates are curved, the bullet will still tend to ricochet and impact the impact surfaces, rather than simply slide around the deceleration chamber as is common in circular or helical traps. Having the bullet forcefully impact the impact plates lessens the amount of lead dust which is released as the bullet is brought to a stop.

The impact plates 132, 134 and 136 are held in place by the support frame 40 and the support leg. Those skilled in the art will appreciate that either the support frame 40 or the support leg 44 could be omitted. Furthermore, numerous other configurations for holding the plates can be used. This can include a free mounting situation, as described above, wherein the plates are not fixedly attached to support frame 40 or the support leg 44. In the alternative, the curved plates can be attached in a conventional configuration where they are fixedly attached at the ends or on other locations.

Figure 6:
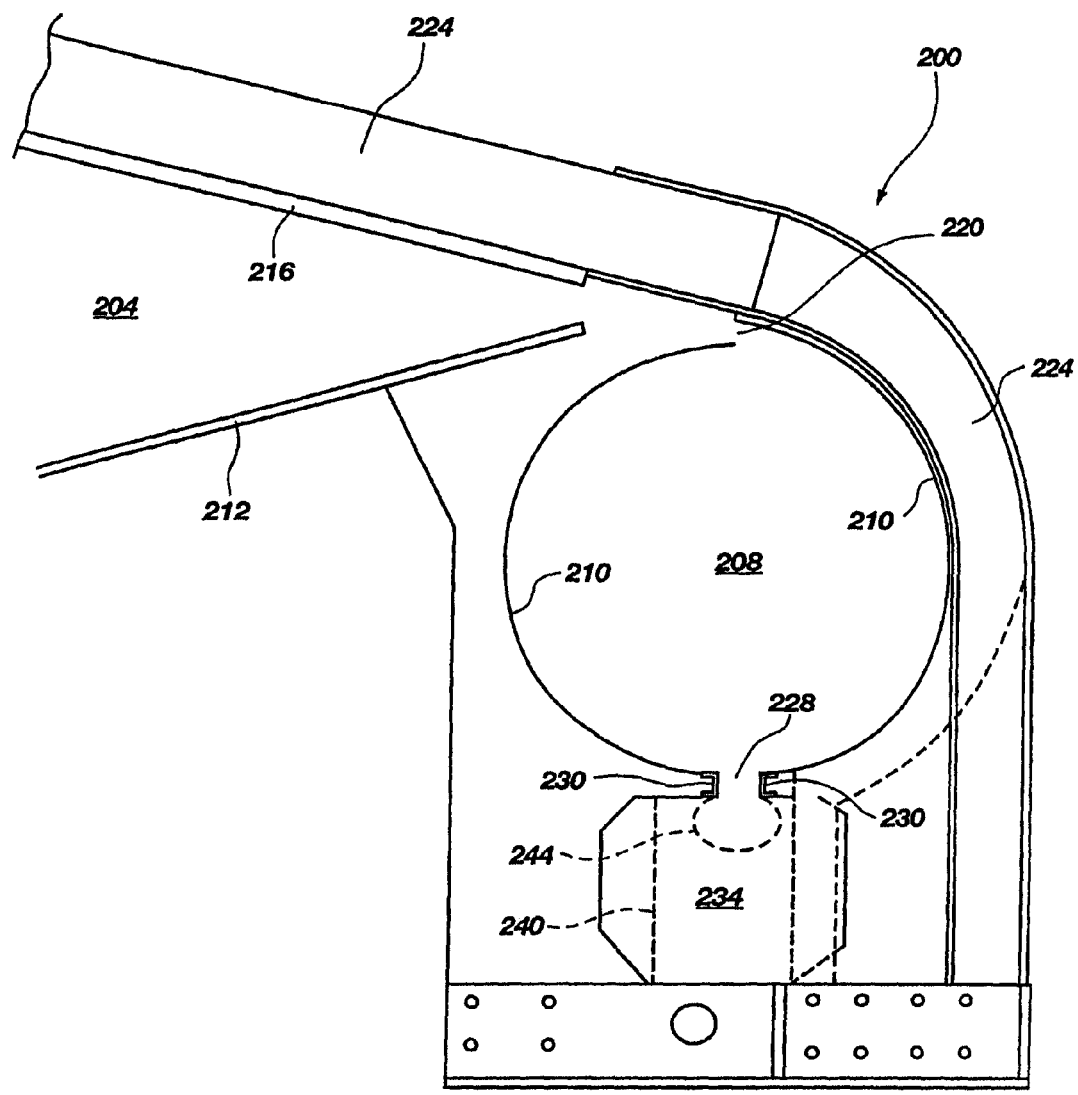
FIG. 6 shows a side cross-sectional view of a bullet trap made in accordance with the principles of the present invention.

Turning now to FIG. 6, there is shown an alternate embodiment of a bullet trap, generally indicated at 200, made in accordance with the principles of the present invention. The bullet trap 200 includes a channel portion 204 and a bullet containment chamber 208 formed by a pair of chamber backing plates 210. The chamber backing plates are essentially impact plates similar to those discussed above, but are sufficiently round that the number of impacts are minimized. The channeling portion 204 is formed by a plurality of plates 212 and 216 which form lower and upper plate surfaces, respectively, for channeling bullets into an aperture 220 of the bullet containment chamber 208.

The plates 216 which form the top of the channeling portion 204 are held in place by a support beam 224. In traditional bullet traps, the support beam is a generally straight beam which has a plurality of legs attached thereto for holding the beam in places. The bullet container is then positioned under the support beam and may be attached to the legs.

In the embodiment shown in FIG. 6, the support beam 224 is curved so that it forms its own support leg. Furthermore, the bullet containment chamber 208 can be suspended directly on the support beam. By providing a single support beam without separate legs, assembly time can be reduced. Furthermore, the support beam 224 may be modular if desired, and may be reduced in thickness as it extends toward the end of the channeling portion 204, to thereby reduce the amount of steel which is contained in the support beam.

Also shown in FIG. 6 are a pair of flanges 230 which are attached adjacent an egress 228 of the bullet containment chamber 208. The flanges 230 can be used for a variety of purposes. For example, below the egress 228 is formed a bullet disposal chamber 234. The bullet disposal chamber 234 can house buckets 240 which are manually emptied. In the alternative, it may house a disposal system 244, such as a pneumatic conveyer, a belt conveyer or a screw conveyor for transporting bullets to one end of the bullet trap where they may be disposed of properly.

When a bullet is fired at the bullet trap 200 it will initially impact one of the channeling plates 212 or 216. The bullet will then ricochet one or more times until it enters the aperture 220 of the bullet containment chamber 208. Once in the bullet containment chamber 208, the bullet will ricochet or slide to a stop along the generally circular walls of the bullet containment chamber and fall through the egress 228. The bullet will then enter the bullet disposal chamber, where it will rest in the bucket 240 or be moved by the disposal system 244.

Figure 6A:
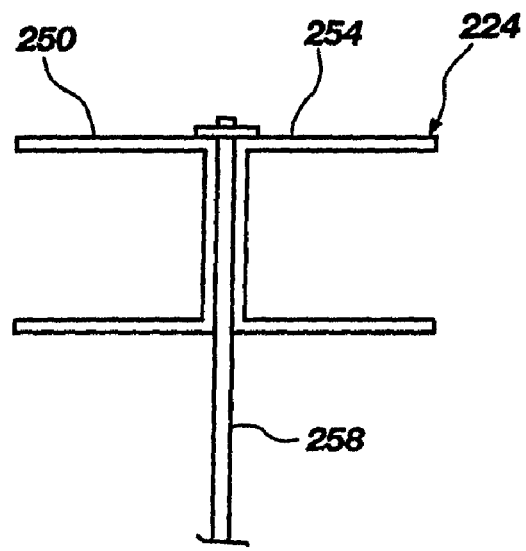
FIG. 6A shows a cross-sectional view of the support beam of FIG. 6 with a hanger.

Turning now to FIG. 6A, there is shown a cross-sectional view of the support beam 224. The support beam 224 may be formed from a single beam, such as an I-beam, or may be constructed from one or more other beam configurations. (With a modular beam, an I-beam could also be used for part of the beam, with other configurations used for other portions).

As shown in FIG. 6A, the support beam 224 is formed by two C-shaped beam members 250 and 254. This configuration is advantageous because it allows a hanger 258 to be readily attached to the beam 224. While FIG. 6 shows the plates 216 being attached directly to the support beam 224, the beams may be placed at a different angle than the plates. The hanger 258 allows for such a compensation.

Figure 6B:
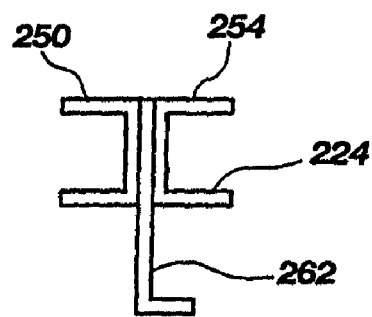
FIG. 6B shows a cross-sectional view of the support beam with a foot for supporting the support beam.

Likewise, FIG. 6B shows a similar configuration of the support beam 224. Instead of an hanger, however, a foot 262 is attached to the C-shaped beam members 250 and 254. This configuration enables the lower plates 212 to be used without numerous support legs as is currently used in similar bullet traps.

Figure 6C:
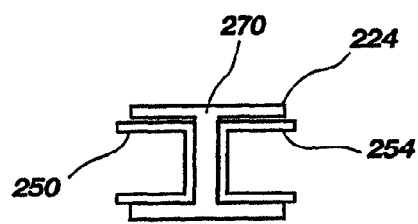
FIG. 6C shows a cross-sectional view of an alternate configuration of the support beam of FIG. 6.

FIG. 6C shows yet another configuration of the support beam 224. The support beam 224 has an I-beam 270 disposed between the C-beams 250 and 254. In such a configuration, an I-beam could be used for part of the support beam 224 with attached C-beams forming another portion of the support beam.

Figure 7:
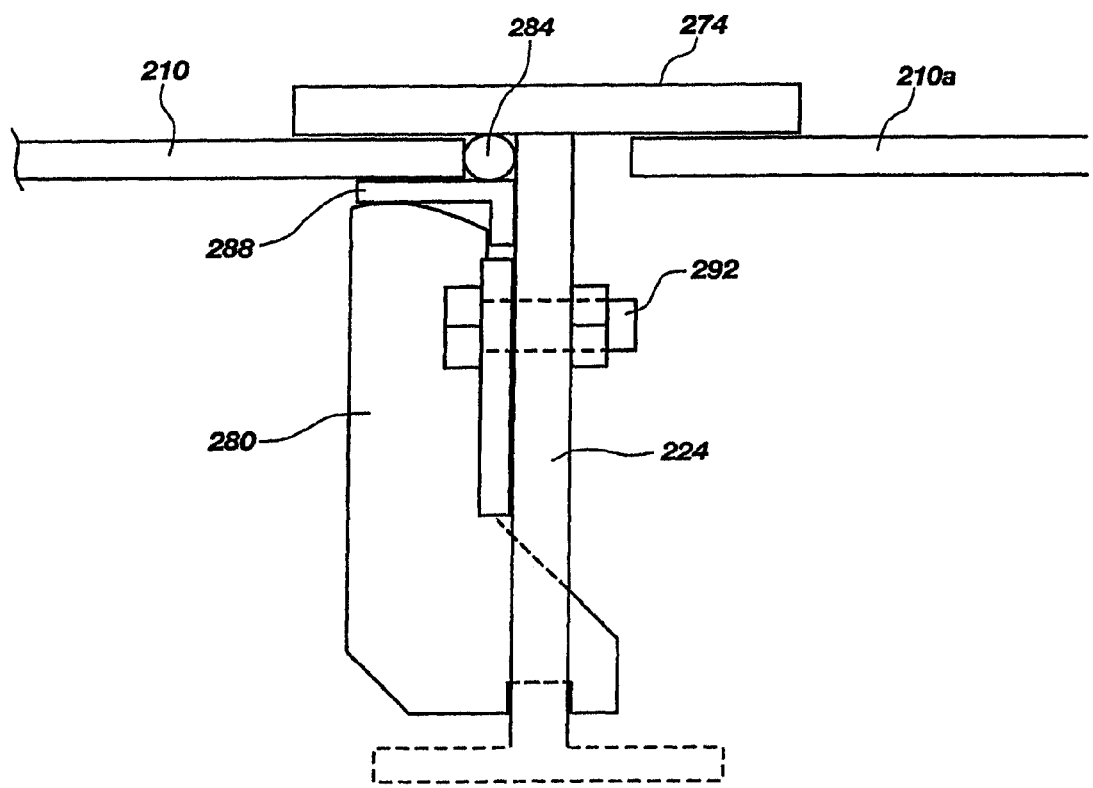
FIG. 7 shows a cross-sectional view of the bullet containment backing plates and a joint structure for holding the plates together without the need for interspaced side walls.

Turning now to FIG. 7, there is shown a cross-sectional view of a portion of the chamber backing plate 210 and support beam 224 to show a mechanism for forming the bullet containment chamber 208. As was mentioned previously, the support beam 224 can be curved. If desired, the curve may be configured to the dimensions of the back of the bullet containment chamber 208. A flange 274 of the support beam forms a facing strip which is disposed on the inside of the bullet containment chamber. The chamber backing plates 210 are then disposed against the flange 274 so that the flange covers the juncture between the plates.

While the chamber backing plates 210 could be bolted onto the flange in a similar manner as discussed with respect to FIG. 2 or FIG. 2A, or in the method taught for joining plates below, the configuration shown in FIG. 7 utilizes a clamp device or cam which applies a compressive force against the chamber backing plates 210 to prevent bullets from passing between the flange 274 and the chamber backing plates. The clamping device 280 is preferably pivotably attached to the support beam 214. Once the chamber backing plates 210 are disposed adjacent the flange 274, the clamping device 280 is rotated about a bolt 292 to force the chamber backing plates against the flange. Additionally, a sealing strip 284, made out of lead, rubber, epoxy, or other material, is placed behind the flange to ensure that no bullet fragments can escape from the bullet containment chamber 208. Additionally, a filler or wedge 288 can be disposed along the backing chamber to apply pressure from the clamping device 280 along the chamber backing plate 210 to hold the sealing strip 284 in place.

While FIG. 7 does not show the clamping device 280 engaging the backing plate 210a, it will be appreciated that the clamping device could engage both. In the alternative, clamping devices could be configured to engage the two plates in an alternating configuration, etc. Additionally, support beam 224 is shown with a dashed end opposite the flange 274 to demonstrate that a wide variety of beam configurations can be used in accordance with the principles of the present invention.

Ideally, the chamber backing plates 210 and the flange 274 of the support beam are configured with slightly different curvatures. When the clamp devices 280 are rotated into an engaging position, the pressure from the clamping devices forces one of the flange and the chamber backing plates to conform to the other, thereby ensuring that they securely engage one another and prevent bullet fragments from passing through the joint. It should be appreciated that a wide variety of clamping devices or direct bolting attachment can be used.

Figure 7A:
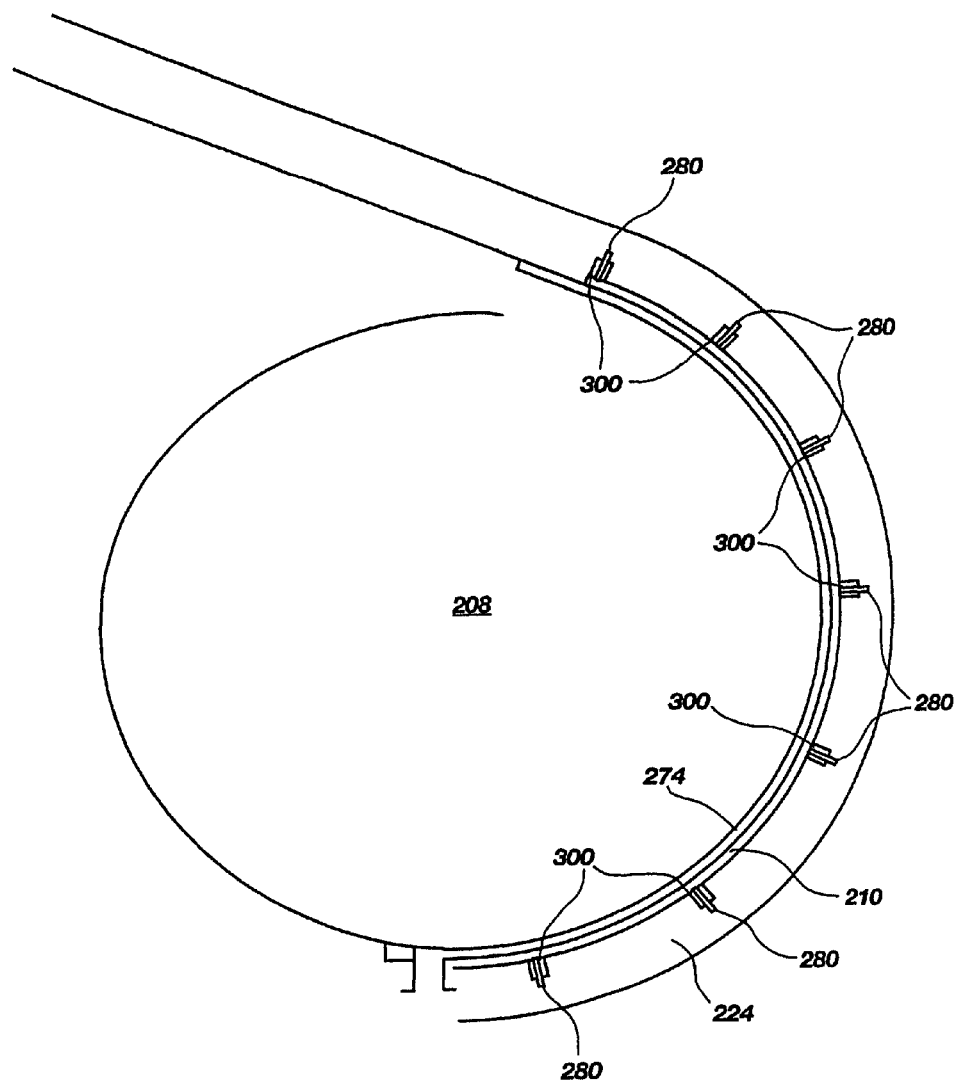
FIG. 7A shows a side view of a support beam having holes for receiving the clamping mechanism for attaching the bullet containment chamber backing plates to the support beam.

Turning now to FIG. 7A, there is shown a cross-sectional view of a bullet containment chamber 208 formed in accordance with the embodiment of FIG. 7. The chamber backing plates 210 which form the rear wall of the chamber are attached to the support beam 224 by the clamping devices 280 which press them against the flange 274. In this manner, the support beam 224 becomes an actual part of the bullet containment chamber 208. Additionally, because each backing plate 210 can attach to the beam 224, there is no need for side walls within the chamber 208. This prevents the requirement of using deflector plates to protect the sidewalls, and allows a wider range of cross shooting on a shooting range. Prior to the present invention, a bullet containment chamber would have side walls, or would only be as wide as a single piece of metal. While a single piece of metal can be formed to relatively long lengths, transportation and support of such a piece of metal and shaping a single piece into the desired configuration would be cost prohibitive. In the present configuration, the chamber backing plates can be joined end to end in a horizontal array to form a bullet containment chamber which is as wide as desired without any side plates intersecting the chamber.

Also shown in FIG. 7A are a plurality of openings 300 or voids formed in the support beam 224. The openings 300 are configured to receive the clamping devices to allow them to move as desired. It will be appreciated, however, that the clamping devices can be formed so that they are simply attached and pivotable with respect to the support beam.

Figure 8:
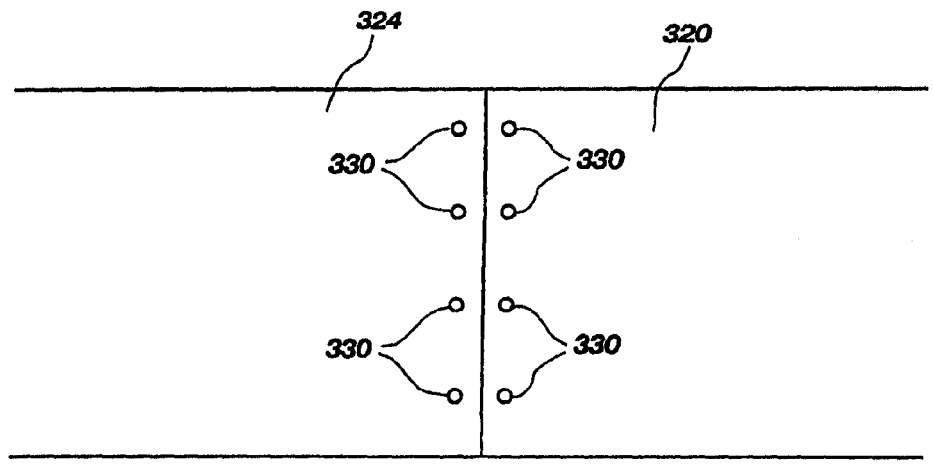
FIG. 8 shows a view of a pair of plates having an attachment mechanism attached thereto in accordance with principles of the present invention.

FIG. 8 shows a pair of plates, 320 and 324 having an alternate attachment configuration disposed thereon. Disposed along the edges of the plates 320 and 324 are a plurality of fasteners, typically in the form of nuts 330 welded to the plates. As mentioned above with respect to FIG. 2A, bolts can be welded to the plates to enable to two plates to be held together without a facing strip on the shooting side of the plates. It has been found, however, that welding the nuts 330 to the plates 320 and 324 is preferred. First, the nuts 330 provide greater surface area and thereby are less likely to break. Second, it is much easier to stack plates 320 and 324 with nuts 330 attached than to stack such plates with bolts attached. Thus, the use of nuts 330 makes transport much easier.

Figure 8A:
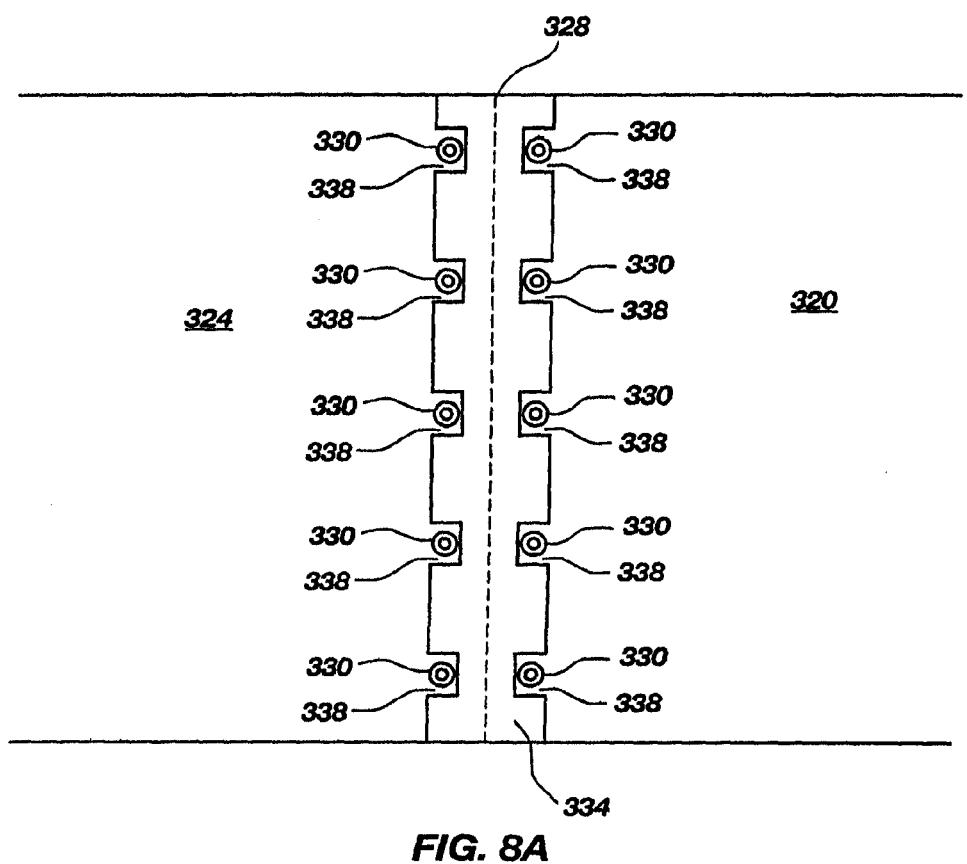
FIG. 8A shows a view of the plates of FIG. 8 having a middle plate attached thereto.

Turning now to FIG. 8A, there is shown a top view of the plates 320 and 324 with the nuts 330 attached thereto. Disposed over the seam 328 between the plates is a middle plate 334. The middle plate 334 is configured to cover the seam 328, but to not interfere with the nuts 330. Thus, the middle plate 334 has notches 338 formed therein. Those skilled in the art will appreciate that the notches can be formed as open sided voids, or could be holes formed in the middle plates. In the alternative, the middle plate could be configured to simply end inside of the nuts 330.

Figure 8B:
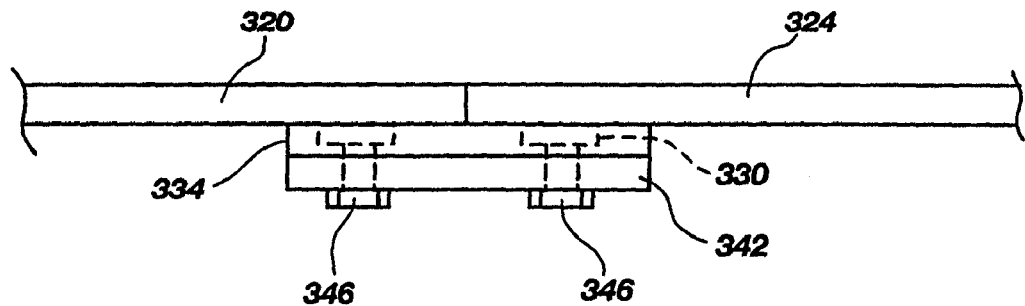
FIG. 8B shows an end view of the embodiment of FIGS. 8 and 8A with a backing plate and bolts attached.

FIG. 8B shows an end view of the plates 320, 324 and the middle plate 334. A backing plate 342 is disposed on the middle plate 334 and a pair of bolts 346 are disposed to extend through the backing plate and into engagement with the nuts 330. By tightening the bolts 346, the backing plate 342 is forced against the middle plate 334 to thereby hold the middle plate securely against the seam 328. This configuration enables plates 320 and 324 to be used to decelerate or channel bullets without having an exposed facing strip. This, in turn, increases the ability to use a bullet trap for cross shooting as there is much less risk of a ricochet, while ensuring that bullet fragments will not pass between the plates 320 and 324.

Figure 8C:
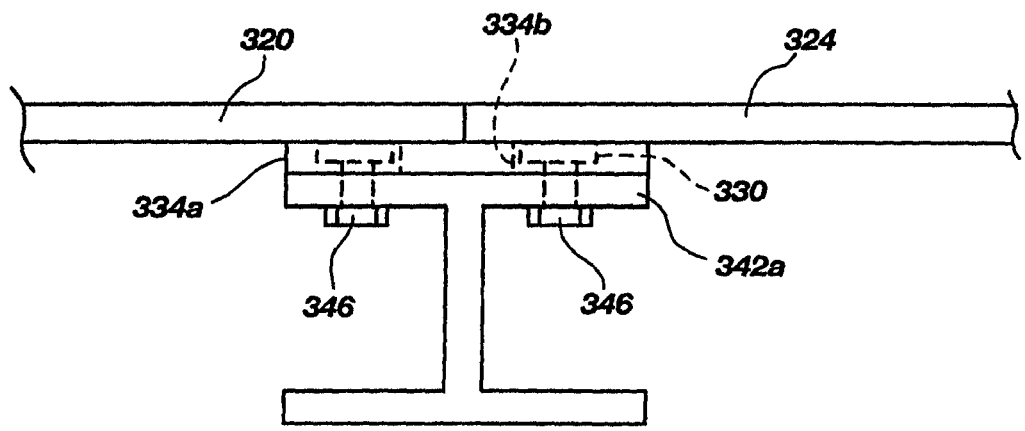
FIG. 8C shows an end view of an alternate embodiment of FIGS. 8 and 8A with a support beam forming the backing plate.

FIG. 8C shows an end view of the embodiment of FIGS. 8 and 8A. The plates 320 and 324 have middle plate 334a. As indicated by the dashed lines, the middle plate 334b can be narrower than the nuts 330.

The middle plate 334b is held in plate by a backing plate 342a which is formed by a portion of an I-beam. Bolts 346 extend through the portion of the I-beam to engage the nuts 330, and thereby hold the plates 320 and 324 adjacent one another. Based on the present disclosure, those skilled in the art will appreciate that a variety of different beam configurations, including C-beams, T-beams and the like, can be used to support the plates 320 and 324 and to hold the plates next to one another.

Figure 9:
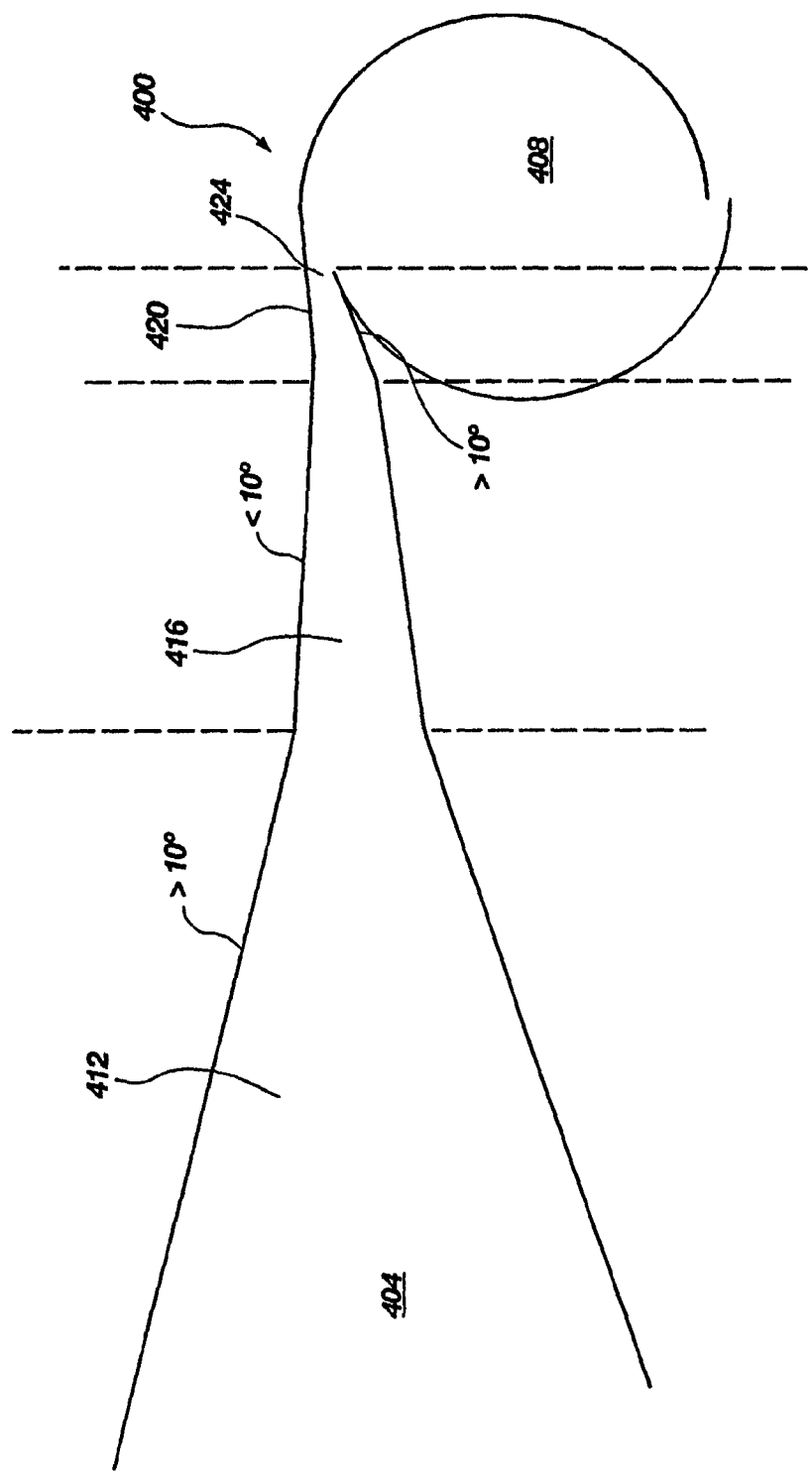
FIG. 9 shows a cross-sectional view of a bullet trap having a plurality of impact zones for decelerating bullets.

Turning now to FIG. 9, there is shown a cross-sectional view of a bullet trap having a plurality of impact zones for decelerating bullets. In the prior art, it has been recognized that it is desirable to have a very low angle of impact between the bullet and the channeling plates which direct the bullet toward the aperture of the bullet containment chamber. The common angle of the channel for a bullet trap is typically about 15 degrees for both the bottom and top plates with the top descending at an angle of 15 degrees and the bottom ascending at an angle of 15 degrees.

With such an angle, the bullets traveling horizontally will impact the channeling plates at an angle of about 15 degrees. The bullets typically ricochet off the plates and hit the opposing plates at an angle of about 30 degrees. Due to the sharper angle, this second impact point often receives more wear than the initial impact point.

Recently there has been a movement to switch over from lead to tungsten bullets. The tungsten bullets are better for the environment as they do not contain toxic lead. Unfortunately, such bullets will be harder on bullet traps. After prolonged usage, prior art bullet traps may show significant wear in the secondary impact zone.

While certain proposals have been made to reduce wear by lowering the angle of channeling plates to about 7 degrees, such an angle would require large amounts of steel and property to produce a trap large enough. In accordance with the present invention, however, it has been found that wear associated with secondary impact can be reduced significantly by providing a channel with changing angles. Thus, in FIG. 9, there is shown a bullet trap, generally indicated at 400. The bullet trap includes a channel portion 204 and a bullet containment chamber 408.

The channeling portion 404 includes a primary or first impact zone 412 having at least one plate surface which is disposed at greater than 10 degrees from horizontal (preferably between about 10 and 20 degrees and most preferably about 15 degrees), and a secondary or second impact zone 416 having at least one plate surface which is less than 10 degrees from horizontal. Ideally, both the top and bottom plates surfaces in the first impact zone are disposed at about 15 degrees and the top and bottom plate surfaces of the second impact zone are disposed between 5 and 10 degrees.

In accordance with the present invention, a preferred embodiment further includes a second primary or third impact zone 420 having at least one plate surface which is greater than 10 degrees and preferably between 10 and 20 degrees and most preferably about 15 degrees.

By having first, second and third impact zones 412, 416 and 420, bullets are channeled into the bullet containment chamber with less wear on the trap. Additionally the impact zones 412, 416 and 420 are configured to minimize the risk of rounds hitting the back of the containment chamber 408 without having first been decelerated. Rather, if a round passes through the aperture 424 without first hitting one of the impact zones, it will hit the top of the bullet containment chamber. The generally arcuate nature of the bullet containment chamber results in an initial impact of about 15 degrees or less, causing little damage. The bullet then travels around the bullet containment chamber 408 until it comes to a rest.

Those skilled in the art will appreciate that the bullet trap 400 can be built with a variety of construction methods, including those discussed above. Furthermore, a bullet containment chamber having a plurality of impact plates could also be used.

Thus, there is disclosed an improved bullet trap. Those skilled in the art will appreciate numerous modifications which can be made without departing from the scope and spirit of the present invention. The appended claims are intended to cover such modifications.

What is claimed is:

1. A method for supporting a bullet trap comprising:
   selecting a beam having a first end suspended above the ground and the second end extending downward so as to substantially rest on the ground, wherein at least a portion of the beam is curved such that the beam has a first portion disposed at a first angle and a second portion disposed at a second angle; and
   suspending a plurality of metallic plates therefrom to form bullet channeling surfaces.

2. The method according to claim 1, wherein the method further comprises suspending a bullet containment chamber from the beam.

3. The method according to claim 2, wherein the beam forms a portion of the bullet containment chamber.

4. The method according to claim 1, wherein the beam is modular and wherein at least a portion of the beam is formed from a pair of C-beams.

5. The method according to claim 4, further comprising disposing a foot between the pair of C-beams.

6. The method according to claim 4, further comprising disposing a hanger between the C-beams.

7. The method according to claim 1, wherein the method comprises using a beam which is an I-beam.

8. A support system for bullet traps comprising:
   a bullet trap, the bullet trap comprising a bullet containment chamber formed from a plurality of steel impact plates and having an inlet, an outlet, and a generally round side cross section, and further comprising an inlet channel having an upper channel plate and a lower channel plate and being configured for directing bullets into the inlet of the bullet containment chamber; and
   a support beam having a first section which extends forwardly from the bullet containment chamber so as to extend above the upper channel plate, a second, bent middle section, and a third section which extends downwardly from the back of the bullet containment chamber and towards the ground so as to form a support leg for supporting the bullet containment chamber.

9. The support system of claim 8, wherein the upper channel plate is attached to the first section of the support beam.

10. The support system of claim 9, wherein the upper channel plate is suspended from the first section of the support beam by hangers.

11. The support system of claim 8, wherein the bent middle section of the support beam has a shape corresponding to the adjacent section of the bullet containment chamber.

12. The support system of claim 11, wherein at least one of the plurality of steel impact plates is attached to the support beam.

13. The support system of claim 8, wherein the support beam is an I-beam.

14. A bullet containment system comprising:
   a one-piece beam having a first end suspended above the ground and the second end extending downwardly toward the ground, the one-piece beam being bent so as to have a first portion and a second portion disposed at an angle relative to the first portion;
   a bullet containment chamber attached to and suspended from the one-piece beam; and
   wherein the first portion extends outwardly over the bullet containment chamber and the second portion extends downwardly from the bullet containment chamber.

15. The bullet containment system of claim 14, wherein the one-piece beam has an arcuate portion between the first portion and the second portion.

16. The bullet containment system of claim 14, wherein the second portion extends under a portion of the bullet containment chamber such that a portion of the bullet containment chamber rests on the one-piece beam.

17. The bullet containment system of claim 14, wherein the one-piece beam comprises a flange and wherein the bullet containment chamber is formed by a plurality of metallic plates, at least one of the plurality of metallic plates being attached to the flange.

18. The bullet containment system of claim 17, wherein the at least one of the plurality of metallic plates is bolted to the flange.

19. The bullet containment system of claim 17, further comprising a cam, and wherein the cam presses the at least one of the plurality of metallic plates against the flange.

20. The bullet containment system of claim 14, wherein the one-piece beam is an I-beam.

* * * * *